Jan. 22, 1929.

S. I. FEKETE ET AL 1,699,783

MOTOR VEHICLE

Filed April 10, 1925

INVENTORS:
Stephen I. Fekete & Millard H. Toncray
by Macleod Calver Copeland & The
Attys.

Patented Jan. 22, 1929.

1,699,783

UNITED STATES PATENT OFFICE.

STEPHEN I. FEKETE AND MILLARD H. TONCRAY, OF DETROIT, MICHIGAN, ASSIGNORS TO HUDSON MOTOR CAR COMPANY, OF DETROIT, MICHIGAN, A CORPORATION OF MICHIGAN.

MOTOR VEHICLE.

Application filed April 10, 1925. Serial No. 22,077.

As pointed out in a prior application filed August 2, 1923, Serial No. 655,262, of which this case is a continuation in part and with respect to all common subject matter, in the construction of automobiles as at present designed, there are usually secured to the under part of the vehicle a number of cross rods, rock shafts, arms and the like for operating the brakes. In assembling the car each of these small parts has to be put in place separately. The location of the parts is usually accessible only with difficulty so that the when the car is put together by modern chain assembly methods, the putting on of these small parts delays the whole work and causes an entirely disproportionate expense. Ordinarily these parts are put together with the frame bottom side up and taper pins and keys are employed to hold the parts together. Furthermore, under the pressure to do this work rapidly, it is likely to be slighted both by the workman and by the inspector and cars are sometimes turned out which are defective as for instance by the omission of cotter pins or because the ends of the pins are not opened.

The present invention therefore has among its objects to provide an arrangement and method of assembling these small parts with the frame of the vehicle whereby the work can be done economically and perfectly and without delaying the work on the other parts. This result is accomplished by combining the small parts mentioned with a member which is subsequently secured in place in the frame in such a manner as to constitute a cross member of the latter, thus permitting said parts to be assembled with the cross member and inspected before they are placed in the chassis. This work can therefore be done conveniently at the bench and the work inspected there. The work of assembling can therefore be done by the workman in a comfortable convenient position, and the inspection can be performed where the light is good. The present invention therefore not only reduces greatly the direct labor of assembling, but does away with the delays to the general process of assembling.

When such an assembly or unit as that above described is employed, it is desirable, for convenience, that the same be secured to the top or bottom, preferably the former, of the frame side members, as this arrangement renders the attaching means more readily accessible than if the cross member were interposed between the side members, as well as obviating the necessity of carefully fitting the parts. This, however, is impracticable where the body, as is usual in motor vehicle construction, is secured directly to the top of the frame. Moreover, the brake operating pedals, levers, etc., are located within the body and between the side members of the chassis frame, whereas the wheels to which the brakes are applied, and the brakes themselves, are located outside the body and frame. It is therefore necessary that the brake operating means include devices which extend from the interior to the exterior of the body and frame.

The present invention has, therefore, for a further object to provide a combined structure, including a body, a chassis frame, and a brake operating unit or assembly in which the foregoing requirements and desiderata are fulfilled.

The foregoing and other objects of the invention will best be understood from the following description of one mode of practicing the same and the resulting structure illustrated in the accompanying drawings. It will be understood, however, that the particular operations and constructions described and shown have been chosen for illustrative purposes merely, and that the invention, as defined by the claims hereunto appended, may be otherwise embodied and practiced without departure from the spirit and scope thereof.

Figure 1:
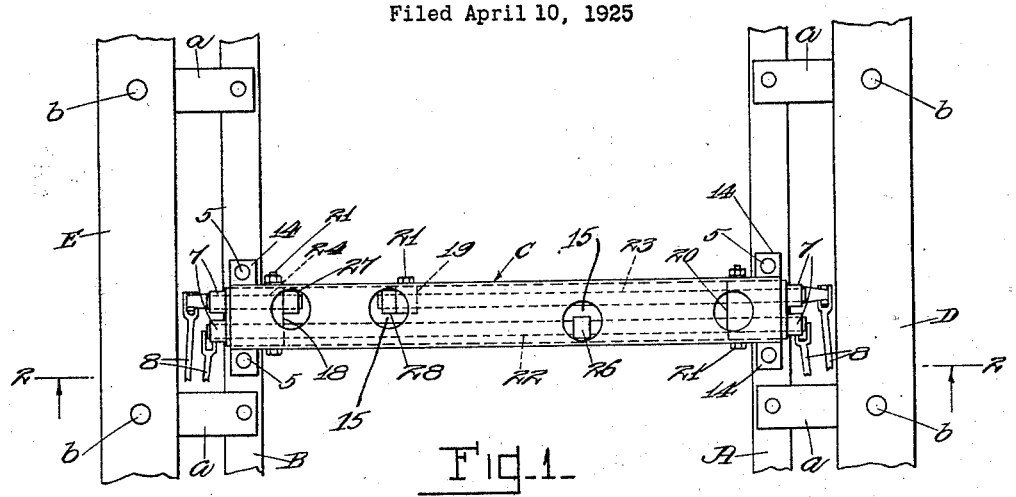
Fig. 1 is a plan view of a cross member and brake operating assembly of the character to which the invention relates, showing also portions of the chassis frame side members, the body sills, and the means for connecting the latter to the former.
Figure 2:
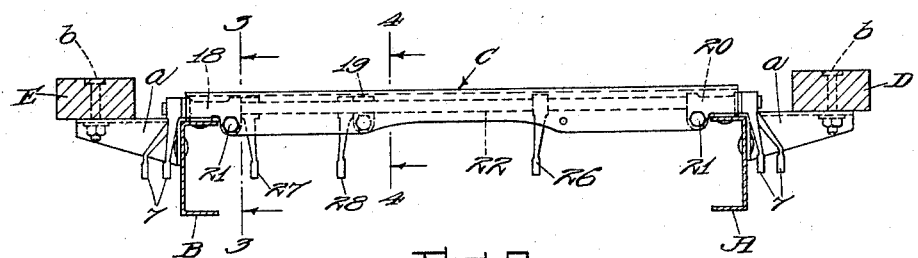
Fig. 2 is a section taken substantially on the line 2—2, Fig. 1.
Figure 3:
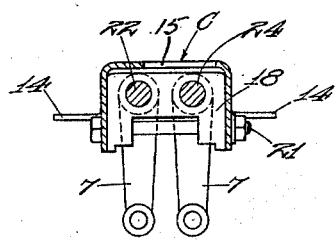
Figure 4:
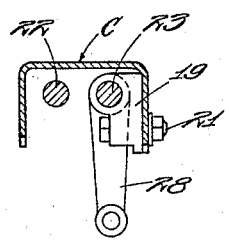

Figs. 3 and 4 are detail sections taken substantially on the lines 3—3 and 4—4, respectively, Fig. 2.

Referring to the drawings, at A and B are shown the two side members of the chassis frame, at C a cross member, and at D and E the body sills. Said body sills are supported from the frame side members A and B by means holding said sills in spaced relation to said frame members outside the latter with the bottoms of said sills substantially on a level with the tops of said members. As herein shown, said means are substantially as more fully described in an application filed July 21, 1923, by Stephen I. Fekete and Stuart G. Baits, Serial No. 652,896, and comprise brackets *a* projecting laterally from the outer sides of the frame members and to which the body sills are secured by bolts *b*.

The cross member C comprises a channel having at its ends ears 14 secured, as by rivets 5, to horizontal (preferably the upper) faces of the frame side members. The top surface of the channel C may be pierced with holes, as at 15, to afford convenient access to the parts secured inside the cross member for the purpose of lubrication.

Inside the cross member are fitted three brackets. Of these brackets, the two end ones 18 and 20 are identical in cross section and are of the shape shown in Fig. 3, while the intermediate bracket 19 is of the shape shown in Fig. 4. Each of these brackets fits the channel closely and is held in place by a bolt 21 which passes through one or both of the flanges of the channel. These brackets support the axial members of the rock shafts which operate the brakes. In the case of the hand brake, (not shown), there is one axial member or cross shaft 22, while in the case of the foot brake there are two cross shafts 23 and 24 in line with each other and intended to be operated simultaneously by an equalizer (not shown). On the outer ends of each of the shafts are placed arms 7, these arms being located outside the side members A and B of the frame. The hand brake cross shaft 22 is provided with an arm 26, while the proximate ends of the two cross shafts 23 and 24 are each furnished with arms 27 and 28. The brackets are so located that the arms abut against the proximate faces of the brackets and hold the cross shafts against lengthwise movement.

In practice, the cross member C, brackets 18, 19 and 20, cross shafts 22, 23 and 24, and four arms 7, and arms 26, 27 and 28 are put together on a work bench and when so assembled form a unit ready for installation as a whole in the chassis, being put in place therein as the chassis travels along with the assembly chain. The cross member can be secured to the side frames either by rivets or by bolts or in any other convenient way.

In case of repair of adjustment the whole assembly can be easily removed and the changes made under the best possible working conditions. The above described means for supporting the body sills from the side members of the chassis frame at the outer sides of the latter and in spaced relation thereto, permit the cross member unit or assembly to be readily applied in overlying relation to the otherwise complete chassis frame and secured to the upper faces of said side members without the necessity of careful fitting and also permit the arms 7 on the cross shafts to depend between the said side members and sills, thereby providing simple and effective operative connections between the portions of the brake mechanism at the interior and exterior, respectively, of the body and frame.

Having thus described our invention, we claim:

1. The combination with the side members of an automobile frame, of a unit comprising a channel forming a cross member secured to said side members, brackets fitted inside the channel, and a plurality of brake operating devices including cross shafts supported by said brackets and extending to the opposite ends of said channel and to the outer sides of said side members.

2. The combination with the side members of an automobile frame, of a unit comprising a channel forming a cross member and secured to said side members, brackets fitted inside the channel, bolts passing from side to side through the flange of the channel and the brackets, cross shafts supported in the brackets, and arms on the cross shafts.

3. A unit comprising a channel forming a cross member for the frame of an automobile, brackets fitted inside the channel, bolts passing from side to side through the flanges of the channel and the brackets, cross shafts supported in the brackets, and arms on the cross shafts, said channel having holes above the junctions of the arms and the cross shafts.

4. In an automobile, a frame having side members, body sills supported from said side members outside the latter and in spaced relation thereto, a cross member secured to said side members, and brake operating devices carried by said cross member and having portions disposed between said side members and body sills.

5. In an automobile a frame having side members, body sills supported from said side members outside the latter and in spaced relation thereto, the bottoms of said sills being substantially on a level with the tops of said side members, a cross member secured to said side members, and brake operating devices carried by said cross member and having portions disposed between said side members and body sills.

6. In an automobile, a frame having side members, body sills supported from said side members outside the latter and in spaced relation thereto, a cross member secured to horizontal faces of said side members, and brake operating devices carried by said cross member and having portions disposed between said side members and body sills.

7. In an automobile, a frame having side members, body sills supported from said side members outside the latter and in spaced relation thereto, a cross member secured to the tops of the horizontal faces of said side members, and brake operating devices carried by said cross member and having portions disposed between said side members and body sills.

8. In an automobile, a frame having side members, body sills supported from said side members outside the latter and in spaced relation thereto, the bottoms of said sills being substantially on a level with the tops of said side members, a cross member secured to the tops of said side members, and brake operating devices carried by said cross member and having portions disposed between said side members and body sills.

9. In an automobile, a frame having side members, body sills supported from said side members outside the latter and in spaced relation thereto, a cross member secured to said side members, and brake operating devices carried by said cross member, said devices including cross shafts and arms on said cross shafts between said side members and sills.

10. In an automobile, a frame having side members, body sills supported from said side member outside the latter and in spaced relation thereto, a cross member secured to said side members and brake operating devices carried by said cross member, said devices including cross shafts and arms on said cross shafts located respectively between said side members and between said side members and sills.

11. In an automobile, a frame having side members, body sills supported from said side members outside the latter and in spaced relation thereto, a cross member secured to the tops of said side members, and brake operating devices carried by said cross member, said devices including cross shafts and arms on said cross shafts depending between said side members and sills.

12. In an automobile, a frame having side members, brackets projecting outwardly from said side members, body sills supported by said brackets and spaced from said side members, a cross member secured to the tops of said side members, cross shafts carried by said cross member, arms on said shafts between said side members, and other arms on said shafts between said side members and sills.

13. The combination with the side members of an automobile frame, of a unit comprising a cross member overlying and secured to said side members and having assembled therewith brake operating devices extending from between said side members to the outer sides thereof.

In testimony whereof we affix our signatures.

STEPHEN I. FEKETE.
MILLARD H. TONCRAY.